(12) United States Patent
Specht

(10) Patent No.: US 6,204,569 B1
(45) Date of Patent: Mar. 20, 2001

(54) CONTROLLER FOR A SEATBELT TIGHTENER

(75) Inventor: Martin Specht, Feldafing (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/349,066

(22) Filed: Jul. 8, 1999

(30) Foreign Application Priority Data

Aug. 10, 1998 (DE) .............................................. 198 36 197

(51) Int. Cl.[7] .............................. B60R 21/32; B60Q 1/00
(52) U.S. Cl. ...................... 307/10.1; 307/9.1; 180/268; 180/282; 280/728.1; 701/45
(58) Field of Search ..................................... 307/10.1, 9.1; 340/660, 661, 436; 280/728.1, 735; 180/282, 208; 701/45

(56) References Cited

U.S. PATENT DOCUMENTS

| | | | |
|---|---|---|---|
| 3,935,470 | * | 1/1976 | Cake .................................... 307/10.1 |
| 5,656,991 | * | 8/1997 | Hargenrader et al. ............ 280/728.1 |
| 5,734,318 | * | 3/1998 | Nitschke et al. ..................... 180/282 |
| 5,957,988 | * | 9/1999 | Osajda et al. ........................... 701/45 |

* cited by examiner

Primary Examiner—Albert W. Paladini
(74) Attorney, Agent, or Firm—Lonnie Drayer

(57) ABSTRACT

A controller for a seatbelt tightener puts on standby an electric igniter of a tightener drive, with a first electric circuit that includes the electric igniter and is closed upon buckling of the belt buckle. Monitoring of seatbelt usage is achieved by a first test signal proportional to the electric internal resistance of the igniter that is scanned using a second circuit which comprises a test resistance and is closed on unbuckling the belt buckle, a second test signal proportional to the test resistance being scanned.

19 Claims, 2 Drawing Sheets

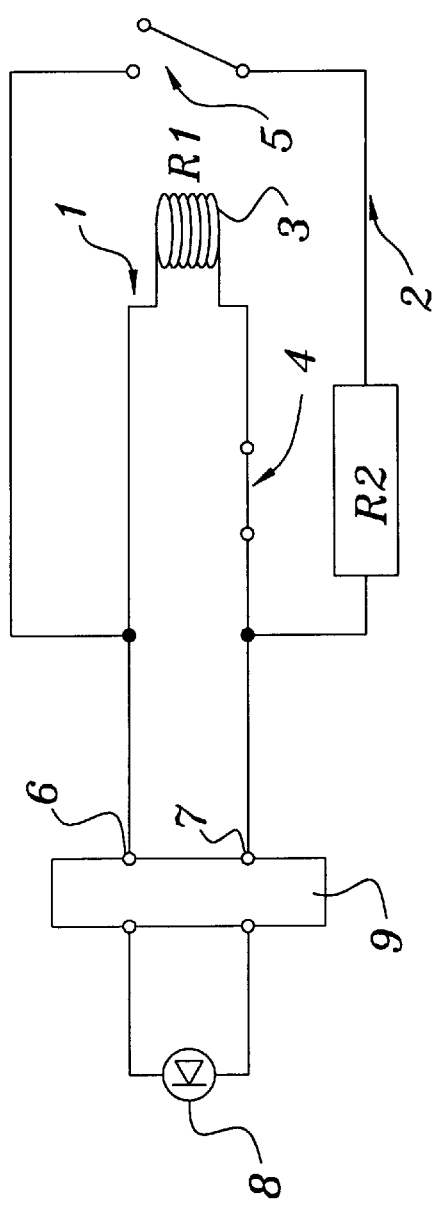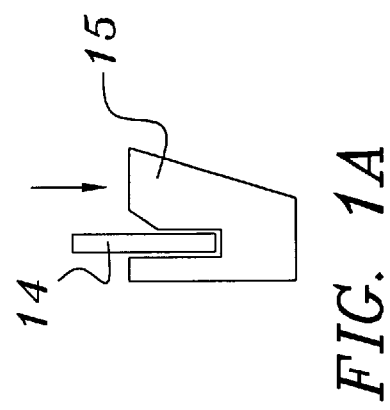
FIG. 1B
FIG. 1A
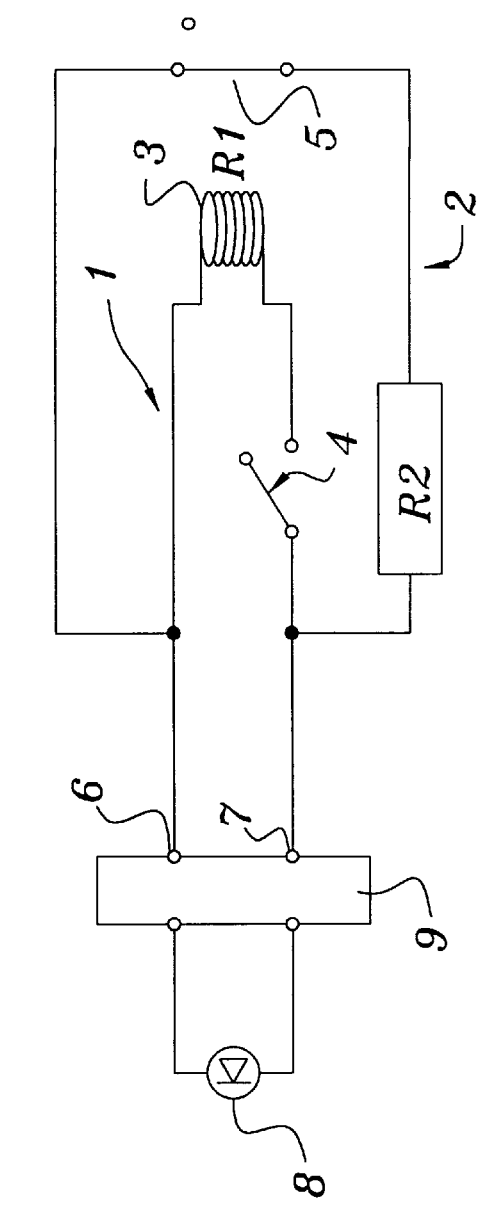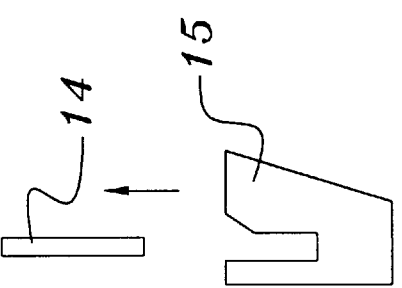
FIG. 2B
FIG. 2A

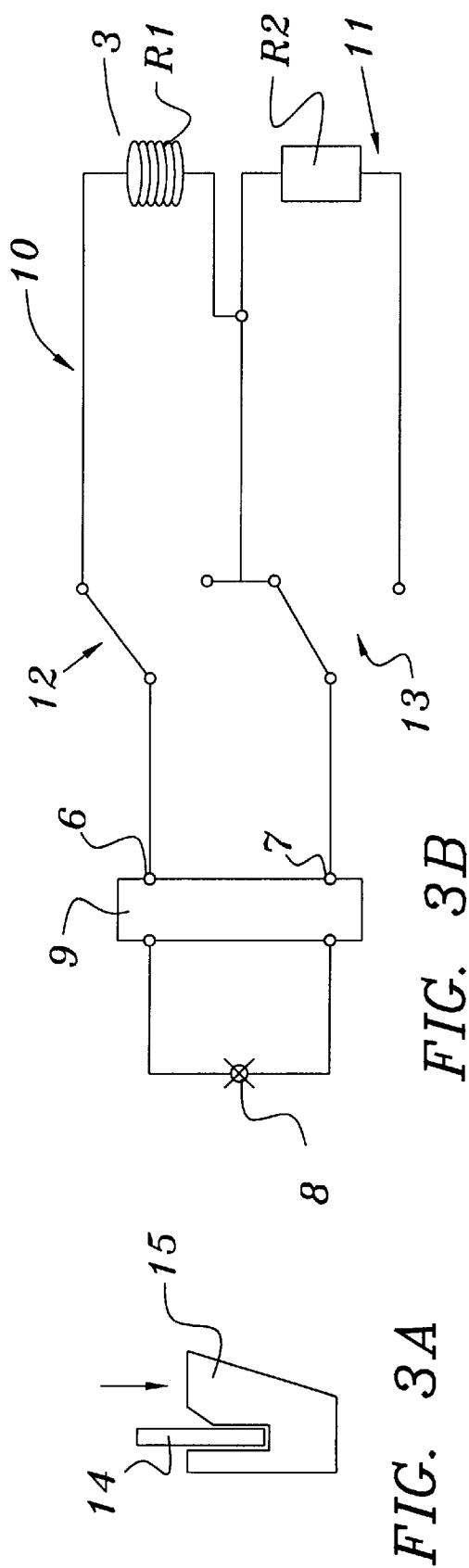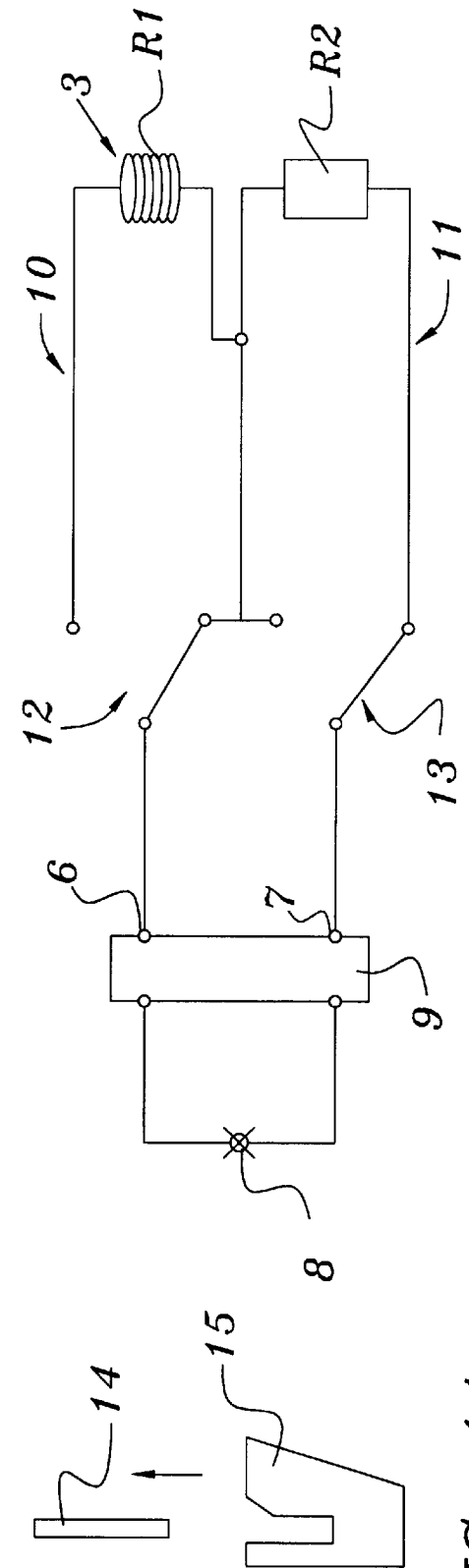

CONTROLLER FOR A SEATBELT TIGHTENER

FIELD OF THE INVENTION

The present invention relates to a device for putting on standby an electric igniter of a tightener drive for tightening a seatbelt with an ignition circuit which carries an ignition current generated in the event of a crash.

BACKGROUND OF THE INVENTION

A tightener drive for tightening a seatbelt causes belt slack in the seatbelt to be eliminated in the event of a crash. The tightener drive is activated in a known manner by a vehicle sensor, an electric igniter serving to ignite a propellant for the tightener drive. Up to now, in the event of a crash, all tightener drives allocated to the vehicle seats are activated regardless of whether or not a particular vehicle seat is occupied.

SUMMARY OF THE INVENTION

It is an object of the invention to provide a device of the type mentioned at the outset with which seatbelt usage can be reliably detected. According to the invention, this object is achieved by the device defined in claim 1. With the invention, therefore, the igniter is put on standby by the buckling of the belt buckle, in particular during insertion of the belt tongue into the belt buckle. This is effected by closing the ignition circuit containing the igniter and via which the necessary ignition current is supplied in the event of a crash.

This ignition circuit can be a circuit provided in a monitoring circuit for operation of the igniter. The monitor determines whether the electric igniter is correctly on standby on buckling of the belt buckle and whether this standby state of the igniter is eliminated again on unbuckling of the belt buckle.

In a preferred embodiment of the monitoring circuit, an electric circuit comprising the electric igniter is closed on buckling of the belt buckle, a first test signal proportional to an electric internal resistance of the igniter being scannable, and a second circuit comprising a test resistance is closed on unbuckling the belt buckle, a second test signal proportional to the test resistance being scannable. The two test signals are supplied to an evaluating device which can be part of a central evaluating and control system. The evaluating device determines, for example by comparison, whether the first test signal corresponds to the value of the internal resistance of the electric igniter. If so, the system is ready for operation. The igniter is kept on standby and the tightener drive is activated by the electric igniter in the event of a crash.

The second test signal can also be supplied to the evaluating device which determines, for example by comparison, whether the test signal corresponds to the value of the test resistance. Preferably, the two test signals are combined in the evaluating device and it is determined by respective comparison whether the test signal obtained corresponds to the first test signal when the belt buckle is buckled and to the second test signal when the belt buckle is not buckled.

Each circuit can comprise a switch for opening and closing the respective circuit.

Since, on buckling of the belt buckle, only the first electric circuit comprising the electric igniter is closed, only the igniter of the tightener drive associated with the occupied vehicle seat is kept on standby. The other igniters associated with the tightener drives of the unoccupied vehicle seats are not on standby as the associated first electric circuits are not closed. Therefore, these tighteners are not actuated in the event of a crash.

It can be determined with the monitoring system provided by the invention whether the closure and opening of the first electric circuit takes place in the desired manner on buckling and unbuckling of the belt buckle. As already mentioned above, a first switch state is produced on buckling of the belt buckle in which, with the correct system, the first circuit is closed by, for example, its associated switch and the second circuit is opened by, for example, its associated second switch. A test signal corresponding to the internal resistance of the igniter is received and determined in the evaluating circuit.

Upon unbuckling the belt buckle with a correctly operating system, a second switched state is created in which the first circuit is opened and the second circuit is closed. A test signal corresponding to the test resistance in the second circuit is received and determined by the evaluating device.

The system is operating in the desired manner if the above-described first and second switched states exist.

If the electric circuit for the igniter is not closed when the belt buckle is buckled, for example because the associated switch is defective or there is another type of interruption in the circuit, the evaluating device, in such a third switched state, receives a test signal corresponding to an infinitely great resistance. In this switched state, the second circuit is also interrupted. The evaluating device then triggers an alarm signal, which can be reproduced visibly, for example by a warning light, and/or acoustically.

If the first circuit is not opened upon unbuckling the belt buckle, for example owing to a defective switch, a resistance value consisting of the combined internal resistance of the igniter and the test resistance of the second circuit is produced when the second circuit is closed, and the evaluating device receives a test signal proportional to this combined resistance value. As this differs from the test signal corresponding to the test resistance, the evaluating device also triggers an alarm signal for this fourth switched state, which can be reproduced optically, for example by the warning light, and/or acoustically.

The third switched state in which the two circuits are opened can obviously also be determined if the belt buckle is unbuckled and the fourth switched state in which both circuits are closed can also be determined when the belt buckle is buckled. The corresponding warning signals are also triggered by the evaluating device.

It can be determined through the warning system whether there are defects in one of the two circuits or in both circuits.

The tightener drive can be a conventional, commercially available tightener drive, in particular the tightener drive can serve to pull back the belt buckle and/or to drive a winding shaft of a belt retractor in the belt winding direction.

BRIEF DESCRIPTION OF THE DRAWINGS

FIG. 1A shows a schematic for a buckled belt buckle.

FIG. 1B shows an electrical schematic of the first embodiment for a first switched state when the seatbelt is buckled.

FIG. 2A shows a schematic for an unbuckled belt buckle.

FIG. 2B shows an electrical schematic of the first embodiment for a second switched state when the seatbelt is unbuckled.

FIG. 3A shows a schematic for a buckled belt buckle.

FIG. 3B shows an electrical schematic of the second embodiment for a first switched state when the seatbelt is buckled.

FIG. 4A shows a schematic for an unbuckled belt buckle.

FIG. 4B shows an electrical schematic of the second embodiment for a second switched state when the seatbelt is unbuckled.

DETAILED DESCRIPTION OF THE INVENTION

In the embodiment shown in FIGS. 1B and 2B, an electric igniter 3, for example in the form of an ignition coil, with an electric internal resistance R1 and a first switch 4 are provided in the first circuit. This first circuit is connected via terminals 6, 7 to an evaluating device 9. A second circuit 2 contains a second switch 5 and a test resistance R2. The second circuit is also connected to the terminals 6 and 7 of the evaluating device 9. The two circuits 1 and 2 are mutually connected in parallel. A warning light 8 is connected to the evaluating device 9. The two switches are designed as single-pole switches and can be reed contacts.

With a correctly operating first circuit 1 which forms the ignition circuit, the first switch 4 is closed on buckling of the seatbelt by the insertion of a belt tongue 14 into a belt buckle 15 (FIG. 1A), so that a corresponding supply current can be supplied to the igniter 3 to ignite the tightener drive in the event of a crash. The second circuit is intended to form a monitoring system in which the second switch 5 is opened on buckling of the belt buckle 15. For the monitoring circuit 9 a test signal proportional to the internal resistance R1 of the igniter 3 is supplied in this switched state which is shown in FIG. 1B. This indicates that the system is operating correctly.

Upon unbuckling the belt buckle 15, the first switch 4 in the first circuit 1 is opened and the second switch 5 in the second circuit 2 is closed as the belt tongue 14 is ejected, as shown in FIG. 2. A test signal corresponding to the test resistance R2 is then supplied via the terminals 6, 7 to the evaluating device 9.

If the first switch 4 in the first circuit 1 is not closed on buckling of the belt buckle 15, the evaluating device 9 receives a test signal which corresponds infinitely to a resistance value as the second switch 5 of the second circuit 2 is also opened. The evaluating circuit 9 then triggers an alarm signal, which can be displayed by the warning light 8. An acoustic signal can also be produced if desired.

If the first switch 4 in the first circuit 1 remains closed on unbuckling the belt buckle 15, a test signal corresponding to the reciprocal of the resistances R1 and R2 is produced because the second switch 5 of the second circuit 2 is closed on unbuckling the belt buckle 15, as shown in FIG. 2A. As this test signal also differs from the test signal proportional to the test resistance R2, an alarm signal is produced by the evaluating device 9 and is reproduced by the warning light 8. An acoustic signal can also be produced here if desired. It can therefore be determined by the monitoring system whether the two circuits 1 and 2 are opened or closed. An alarm signal is initiated by the evaluating device 9 in these cases.

FIGS. 3B and 4B show a second embodiment in which two two-pole switches 12 and 13 for first and second circuits 10 and 11 are provided.

The first circuit 10 contains the igniter 3, for example in the form of an ignition coil with the internal resistance R1 and the second circuit 11 contains the test resistance R2. The two two-pole switches 12 and 13 are connected to the common terminals 6 and 7 of the evaluating device 9. The warning light 8 is also connected to the evaluating device 9. With the switch position shown in FIG. 3B, switch contacts of the two switches 12 and 13 are actuated on buckling of the belt buckle in such a way that the first circuit 10 with the igniter 3 is connected to the evaluating device 9. Furthermore, the igniter 3 can be supplied with a supply current in the event of a crash to ignite the tightener drive in this switched position.

In the second switched position (FIG. 4B), the switch contacts of the two two-pole switches 12 and 13 are actuated upon unbuckling the belt buckle, i.e. on extraction of the belt tongue, in such a way that the circuit 10 is severed and the second circuit 11 containing the test resistance R2 is closed.

In the switched state shown in FIG. 3B, the evaluating device 9 contains a test signal corresponding to the internal resistance R1 of the igniter 3 and, in the second switched state (FIG. 4B), the evaluating device 9 contains a test signal proportional to the test resistance R2. This indicates that the arrangement is operating correctly.

If, when changing from the switched state in FIG. 3B to the switched state in FIG. 4B, only the switch contact of the switch 13 is moved downwards into the second switch position and the switch contact of the switch 12 remains in the upper switch position, a circuit is formed in which the two resistances R1 and R2 are contained. The evaluating device 9 receives a test signal corresponding to the series connection of the two resistances R1 and R2 and triggers an alarm signal which is displayed by the warning light 8. If the switch 12 is not actuated during the change from the switched state in FIG. 4B to the switched state in FIG. 3 and only the switch 13 is actuated, a short-circuit test signal is produced which is also detected by the evaluating device 9 and causes the emission of an alarm signal by the warning light 9.

With the embodiment shown in FIGS. 3B and 4B, therefore, it is also possible to determine whether or not the two switches operate correctly on closure of the first circuit 10 containing the igniter 3.

What is claimed is:

1. A controller for a seatbelt tightener comprising an ignition circuit which carries an ignition current produced in the event of a crash to an igniter, wherein the ignition circuit is closed on buckling of the belt buckle and is opened on unbuckling of the belt buckle, the ignition circuit also forming a circuit in a monitoring circuit for operation of the igniter, wherein for monitoring the operation of the igniter on buckling of the belt buckle, a first circuit comprising the electric igniter is closed and a first test signal proportional to an electric internal resistance R1 of the igniter is scannable and in that a second circuit comprising a test resistance R2 can be closed on unbuckling the belt buckle and a second test signal proportional to the test resistance R2 is scannable.

2. The controller for a seatbelt tightener according to claim 1 wherein for monitoring the operation of the igniter on buckling of the belt buckle, a first circuit comprising the electric igniter is closed and a first test signal proportional to an electric internal resistance R1 of the igniter is scannable and in that a second circuit comprising a test resistance R2 can be closed on unbuckling the belt buckle and a second test signal proportional to the test resistance R2 is scannable.

3. The controller for a seatbelt tightener according to claim 2 wherein for monitoring the operation of the igniter on buckling of the belt buckle, a first circuit comprising the electric igniter is closed and a first test signal proportional to an electric internal resistance R1 of the igniter is scannable and in that a second circuit comprising a test resistance R2 can be closed on unbuckling the belt buckle and a second test signal proportional to the test resistance R2 is scannable.

4. The controller for a seatbelt tightener according to claim 3 wherein the two test signals can be combined with one another in an evaluating device.

5. The controller for a seatbelt tightener according to claim 3 wherein switches are provided for the alternate opening and closure of the two circuits.

6. The controller for a seatbelt tightener according to claim 3 wherein common terminals are provided for scanning the two test signals at the evaluating device.

7. The controller for a seatbelt tightener according to claim 3 wherein the two circuits are connected in parallel with one another.

8. The controller for a seatbelt tightener according to claim 3 wherein each circuit comprises a single-pole switch which is a reed contact.

9. The controller for a seatbelt tightener according to claim 2 wherein the two test signals can be combined with one another in an evaluating device.

10. The controller for a seatbelt tightener according to claim 9 wherein switches are provided for the alternate opening and closure of the two circuits.

11. The controller for a seatbelt tightener according to claim 9 wherein common terminals are provided for scanning the two test signals at the evaluating device.

12. The controller for a seatbelt tightener according to claim 9 wherein the two circuits are connected in parallel with one another.

13. The controller for a seatbelt tightener according to claim 9 wherein each circuit comprises a single-pole switch which is a reed contact.

14. The controller for a seatbelt tightener according to claim 1 wherein the two test signals can be combined with one another in an evaluating device.

15. The controller for a seatbelt tightener according to claim 14 wherein switches are provided for the alternate opening and closure of the two circuits.

16. The controller for a seatbelt tightener according to claim 14 wherein common terminals are provided for scanning the two test signals at the evaluating device.

17. The controller for a seatbelt tightener according to claim 14 wherein the two circuits are connected in parallel with one another.

18. The controller for a seatbelt tightener according to claim 14 wherein each circuit comprises a single-pole switch which is a reed contact.

19. The controller for a seatbelt tightener according to claim 1 wherein the two switches are two-pole switches, the internal resistance R1 of the igniter and the test resistance R2 being connectable in series if one of the two switches fails.

* * * * *